(No Model.)
Y. THOMPSON.
DEVICE FOR CARRYING LANTERNS.
No. 565,052.  Patented Aug. 4, 1896.
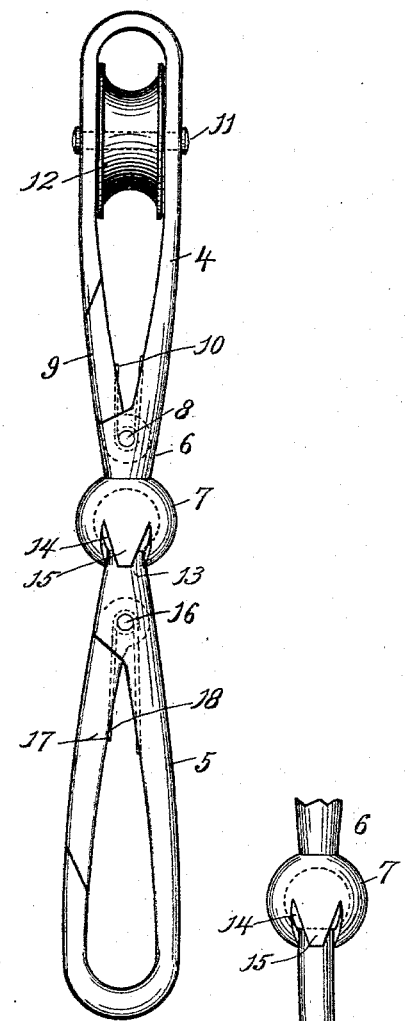
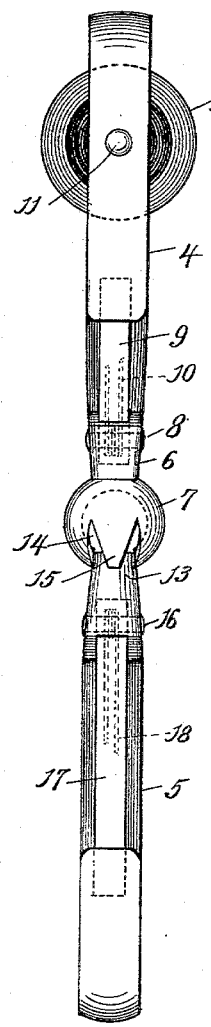
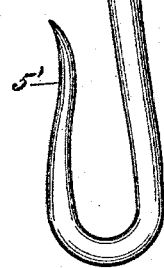

UNITED STATES PATENT OFFICE.

YERN THOMPSON, OF RACINE, WISCONSIN.

DEVICE FOR CARRYING LANTERNS.

SPECIFICATION forming part of Letters Patent No. 565,052, dated August 4, 1896.

Application filed March 20, 1896. Serial No. 584,106. (No model.)

*To all whom it may concern:*

Be it known that I, YERN THOMPSON, of Racine, in the county of Racine and State of Wisconsin, have invented a new and useful Improvement in Devices for Carrying Lanterns, of which the following is a description, reference being had to the accompanying drawings, which are a part of this specification.

My invention has relation to improvements in devices for carrying lanterns.

The device is particularly adapted for use in cow-sheds, barns, stables, hay-lofts, and other places where the danger of fire is very great, owing to quantities of hay, straw, or other substance of an inflammable nature usually stored in such places.

The primary object had in view is to provide a lantern-carrier adaptable for use in places of the above description, and of such construction that the lantern is capable of being swung around at different angles, so as to direct the light toward any particular object.

The invention consists of the devices and parts or their equivalents, as hereinafter more fully set forth.

In the accompanying drawings, Figure 1 is an elevation of the complete device. Fig. 2 is an elevation at right angles to Fig. 1, and Fig. 3 is a fragmentary detail showing a modified form of the lower portion of the carrier.

The carrier consists of two main portions—viz., an upper section 4 and a lower section 5. Both of these sections are looped around at their outer ends, and their inner ends are so connected together as to permit the lower section to swing around in a horizontal plane, so as to direct the light toward any particular object. The lower end of the long arm of the loop of the upper section is shown as broadened, as indicated at 6, said broadened portion terminating in a ball-socket 7. This broadened portion 6 is intersected by a transverse pin 8, upon which is pivoted a snap-hook arm 9. The upper end of this arm is beveled and normally bears against the beveled end of the short arm of the loop, being held thereagainst by a spring 10.

Within the upper portion of the loop of the upper section 4 is a shaft 11, upon which is mounted a pulley 12, grooved peripherally, and having its sides in close juxtaposition to the inner sides of the opposite arms of the loop.

The upper end of the long arm of the loop of the lower section 5 terminates in a straight extension 13, which is formed at its extremity with a ball 14, said ball adapted to fit in the socket 7, whereby a ball-and-socket-joint connection is formed between the two sections to permit of the lower section being swung around horizontally in any direction. This is the preferable form of pivotal connection between the two sections, although I do not wish to be understood as limited thereto, inasmuch as any other desirable pivotal connection may be provided which forms a universal joint. The socket, it will be noticed, is formed with a series of depending tongues 15, which readily admit of the ball being inserted in place, the tongues being bent down over the ball after the latter is fitted in the socket, as clearly shown in the drawings. Intersecting the extension 13 is a transverse pin 16, upon which is pivoted a snap-hook arm 17. The lower beveled end of this arm is adapted to bear against the corresponding beveled end of the short arm of the loop of the lower section, being held normally thereagainst by means of a spring 18.

In the use of my device a suitable means of suspension is provided, such as a wire, cord, rope, chain, or the like. The ends of the suspending device are secured to opposite walls or other supports within the structure in which the lantern is used, and said suspending device is arranged a convenient height above the floor. The free end of the snap-hook arm 9 is then pressed inwardly, so as to admit the wire into the upper loop and to permit of the grooved periphery of the pulley 12 engaging said wire, whereby the carrier is supported in a depending position. The handle or bail of the lantern is now made to engage the lower loop by pressing back the snap-hook arm 17. It will thus be seen that the lantern is suspended overhead, without danger of any inflammable matter being ignited, and that as the person within the barn or other inclosure moves from one point to another the carrier may be readily grasped and caused to travel along the wire to suit the changed position of said person.

It will be noticed that in the form illustrated in Figs. 1 and 2 the lower section is provided with a snap-hook arm 17. In cases where the carrier is suspended at some little distance overhead it will be found difficult to reach high enough to press back said snap-hook arm so as to permit the handle or bail of the lantern to engage the lower section. It will therefore, perhaps, under such circumstances, be advisable to make the lower section merely in the form of an ordinary hook, as indicated at 5', Fig. 3.

What I claim as my invention, and desire to secure by Letters Patent, is—

1. A traveling device for carrying lanterns, consisting of two sections of loop or hook form, the upper section having a pulley journaled between the sides of its loop, said pulley adapted to travel on a wire or trackway, and the lower section adapted to releasably engage the lantern, and the inner end of one section formed with a socket and the corresponding end of the other section with a ball fitting in said socket, whereby a universal-joint connection is formed between the two sections, which permits the lower section to be swung around freely in all directions.

2. In a traveling device for carrying lanterns, the combination, of two sections, of loop form, the longer arm of the loop of one section provided at its inner end with a widened portion which terminates in a ball-socket, and the inner end of the long arm of the loop of the other section terminating in a straight extension provided at its extremity with a ball fitting the socket of the first-named section, a spring-pressed snap-hook arm pivoted to the broadened portion of the long arm of the upper section, and having its free end normally bearing against the end of the short arm of the loop of said upper section, a shaft intersecting the loop of the upper section, and a pulley mounted on said shaft between the sides of the loops.

In testimony whereof I affix my signature in presence of two witnesses.

YERN THOMPSON.

Witnesses:
L. E. HALL,
F. M. ROBERTS.